(12) United States Patent
Goluch (10) Patent No.: US 12,269,431 B1
(45) Date of Patent: Apr. 8, 2025

(54) APPARATUS FOR RECEIVING AND STORING A BINOCULAR

(71) Applicant: William Marek Goluch, Squamish (CA)

(72) Inventor: William Marek Goluch, Squamish (CA)

( * ) Notice: Subject to any disclaimer, the term of this patent is extended or adjusted under 35 U.S.C. 154(b) by 0 days.

(21) Appl. No.: 18/819,917

(22) Filed: Aug. 29, 2024

(51) Int. Cl.
 *B60R 7/08* (2006.01)
 *A45C 11/08* (2006.01)
 *B60R 7/04* (2006.01)
 *B60R 11/00* (2006.01)

(52) U.S. Cl.
 CPC .............. *B60R 7/08* (2013.01); *A45C 11/08* (2013.01); *B60R 7/04* (2013.01); *B60R 2011/0007* (2013.01); *B60R 2011/0057* (2013.01); *B60R 2011/0059* (2013.01); *B60R 2011/0075* (2013.01)

(58) Field of Classification Search
 CPC ........................ B60R 2011/0007; A45C 11/08
 USPC .................... 224/572; 206/316.3; D3/267
 See application file for complete search history.

(56) References Cited

U.S. PATENT DOCUMENTS

| | | | | |
|---|---|---|---|---|
| 2,835,425 A | * | 5/1958 | Shultz | B60R 7/06 224/558 |
| 3,297,218 A | * | 1/1967 | Cassidy | A45C 11/08 224/241 |
| 3,307,757 A | * | 3/1967 | Gatos | G02B 23/18 224/629 |
| 3,782,614 A | * | 1/1974 | Campisi | A45C 11/08 224/909 |
| 4,142,566 A | * | 3/1979 | Stolp | A45C 11/08 229/122 |
| 5,023,706 A | * | 6/1991 | Sandberg | A45C 15/00 359/507 |
| D336,777 S | * | 6/1993 | Ratzlaff | D3/267 |
| 5,226,576 A | * | 7/1993 | Ellsworth | B60R 7/043 224/570 |
| 5,326,175 A | * | 7/1994 | Carter | A01D 75/008 383/22 |
| 5,725,189 A | * | 3/1998 | Landy | B60R 11/02 248/205.2 |
| 6,293,447 B1 | * | 9/2001 | Jorgensen | B60R 7/14 224/571 |
| 6,305,538 B1 | * | 10/2001 | Jackson | B65D 33/00 206/316.3 |
| 7,059,503 B2 | * | 6/2006 | Andersen | A45F 3/14 224/648 |
| 7,448,345 B1 | * | 11/2008 | O'Donnell | B60R 22/10 119/28.5 |
| D601,341 S | * | 10/2009 | Arman | D3/263 |
| 8,251,443 B1 | * | 8/2012 | Hahn | B60R 7/04 297/188.18 |
| 8,430,239 B2 | * | 4/2013 | Shpiner | A45C 11/38 220/252 |

(Continued)

*Primary Examiner* — Justin M Larson
(74) *Attorney, Agent, or Firm* — Nexus Law Group LLP; Nicholas P. Toth (57) ABSTRACT

An apparatus for storing a binocular on the center console of a vehicle is provided. The apparatus includes: a base having a receptacle for receiving the binocular; and one or more mounting straps connected to the base for mounting the base to the center console of the vehicle. The apparatus provides an alternative, accessible and secure storage medium for binoculars in a vehicle.

12 Claims, 10 Drawing Sheets

(56) References Cited

U.S. PATENT DOCUMENTS

| | | | | |
|---|---|---|---|---|
| 8,720,681 B1* | 5/2014 | Hancock | ............ | A45C 13/1069 |
| | | | | 224/183 |
| 8,899,458 B1* | 12/2014 | Heien | ................. | A45F 5/021 |
| | | | | 224/663 |
| 10,384,584 B2* | 8/2019 | Wheeler | ................ | B60N 3/103 |
| D862,882 S | 10/2019 | Hicks | | |
| 11,470,949 B2* | 10/2022 | Racicot | .................. | A45C 11/08 |
| D969,815 S * | 11/2022 | Wright | ......................... | D14/440 |
| 11,889,906 B2* | 2/2024 | Burns | ....................... | A45F 3/14 |
| 11,992,112 B2* | 5/2024 | Racicot | ..................... | A45F 3/14 |
| 2005/0011920 A1* | 1/2005 | Feng | ................... | B60R 11/0252 |
| | | | | 224/929 |
| 2005/0092793 A1* | 5/2005 | Berggren | ............ | B60R 11/0252 |
| | | | | 224/275 |
| 2006/0081669 A1* | 4/2006 | Rissler | ............... | B60R 11/0258 |
| | | | | 224/42.32 |

* cited by examiner

APPARATUS FOR RECEIVING AND STORING A BINOCULAR

BACKGROUND OF THE INVENTION

1. Field of Invention

This invention relates to a novel design for binocular support systems and, in particular, to an apparatus for receiving and storing a binocular in a vehicle.

2. Description of Related Art

Binoculars are a tool that provide views of enlarged images of distant objects and are used in a variety of settings, such as in hiking, wildlife viewing, birding, hunting, stargazing, golf, sports events, military and industrial applications. Given its wide application in usage, binoculars are designed to be transportable. Accordingly, there is a need for binoculars to be quickly and easily accessible in transport, whilst being safely stored in transport when not in use.

Conventionally, binoculars are retained in a chest harness for quick and easy access. However, storing binoculars in a chest harness creates neck and/or back strain and interferes with usage of a seatbelt while the user is in a vehicle.

An example of a prior art binocular storage system adapted for use in a vehicle is described in U.S. Pat. No. D862,882 to Hicks ("Hicks"). Hicks discloses of an adjustable holder with a binocular cradle that is insertable into the cup holder component of a vehicle. However, as the adjustable holder provided in Hicks is not secured in any manner to the vehicle, it can easily be displaced upon sudden braking or movements. The adjustable holder provided in Hicks also occupies the cup holder section of a vehicle and limits use of the cup holders, which is not ideal.

An object of the invention is to address the above shortcomings.

SUMMARY

The above shortcomings may be addressed by providing, in accordance with one aspect of the invention, an apparatus for receiving and storing a binocular on a center console of a vehicle. The apparatus includes: a base having a receptacle for receiving a binocular; and one or more mounting straps connected to the base for mounting the base to the center console.

The receptacle may include a receptacle top and a receptacle bottom opposite the receptacle top. The receptacle bottom may be partially inclined.

The one or more mounting straps may include: a first mounting strap connected to the base in a first direction; and a second mounting strap connected to the base in a second direction perpendicular to the first direction.

The one or more mounting straps may include one or more mounting strap fasteners for fastening the one or more mounting straps to the base.

The base may include a base bottom and a mounting panel connected to the base bottom. The mounting panel may be formed of a flexible material. The one or more mounting straps may be connected to the mounting panel.

The apparatus may include one or more removable restraints connected to the base for retaining the binocular in the receptacle. The one or more restraints may be one or more restraining straps. The one or more restraining straps may have a length and the length may be adjustable. The one or more restraining straps may further include one or more restraining strap fasteners for removably fastening the one or more restraining straps to the base. The one or more restraining strap fasteners may be a magnet and the base may include a second magnet disposed to cooperate with the magnet.

The foregoing summary is illustrative only and is not intended to be in any way limiting. Other aspects and features of the present invention will become apparent to those of ordinary skill in the art upon review of the following description of embodiments of the invention in conjunction with the accompanying figures and claims.

BRIEF DESCRIPTION OF THE DRAWINGS

In drawings which illustrate by way of example only embodiments of the invention.

DETAILED DESCRIPTION

For the purposes of promoting an understanding of the principles of the invention, reference will now be made to the exemplary embodiments illustrated in the drawings, and specific language will be used to describe the same. It will nevertheless be understood that no limitation of the scope of the invention is thereby intended. Any alterations and further modifications of the inventive features illustrated herein, and any additional applications of the principles of the invention as illustrated herein, which would occur to one skilled in the relevant art and having possession of this disclosure, are to be considered within the scope of the invention as defined by the claims.

Referring to FIGS. 1 to 10, the apparatus according to an embodiment of the invention is shown generally at 10. The apparatus is for receiving and storing a binocular on a center console of a vehicle, in particular, on the center console storage compartment of the vehicle. The apparatus includes: a base 12 having a receptacle 14 for receiving the binocular; and one or more mounting straps 16 connected to base 12 for mounting base 12 to the center console.

Referring to FIGS. 1 to 10, base 12 has a receptacle 14 for receiving a binocular. Base 12 is formed in the general shape of a quadrilateral block, and includes a base top 18, a base bottom 20 opposite base top 18, and four base sides 22. Four base sides 22 include a first base side 22a, a second base side 22b, a third base side 22c, and a fourth base side 22d. First base side 22a is opposite third base side 22c, and second base side 22b is opposite fourth base side 22d. Base top 18, base bottom 20, and four base sides 22 may be rounded or flat in shape. As illustrated in FIGS. 1 to 10, base 12 is formed in the general shape of a rectangular block, with rounded and sloped base top 18, flat base bottom 20, and slightly rounded base sides 22. Base 12 is sized and dimensioned to fit neatly on top of the center console storage compartment of most vehicles. While base 12 is formed in the general shape of a quadrilateral block, it will be understood by a person skilled in the art that base 12 may be formed of any other suitable shape, size and dimension. Base 12 may be formed of a solid quadrilateral block of material or may be formed with a hollow or latticed interior, or any suitable combination thereof. Base 12 functions as a foundation or medium for connecting receptacle 14 to the center console of a vehicle.

Figure 1:
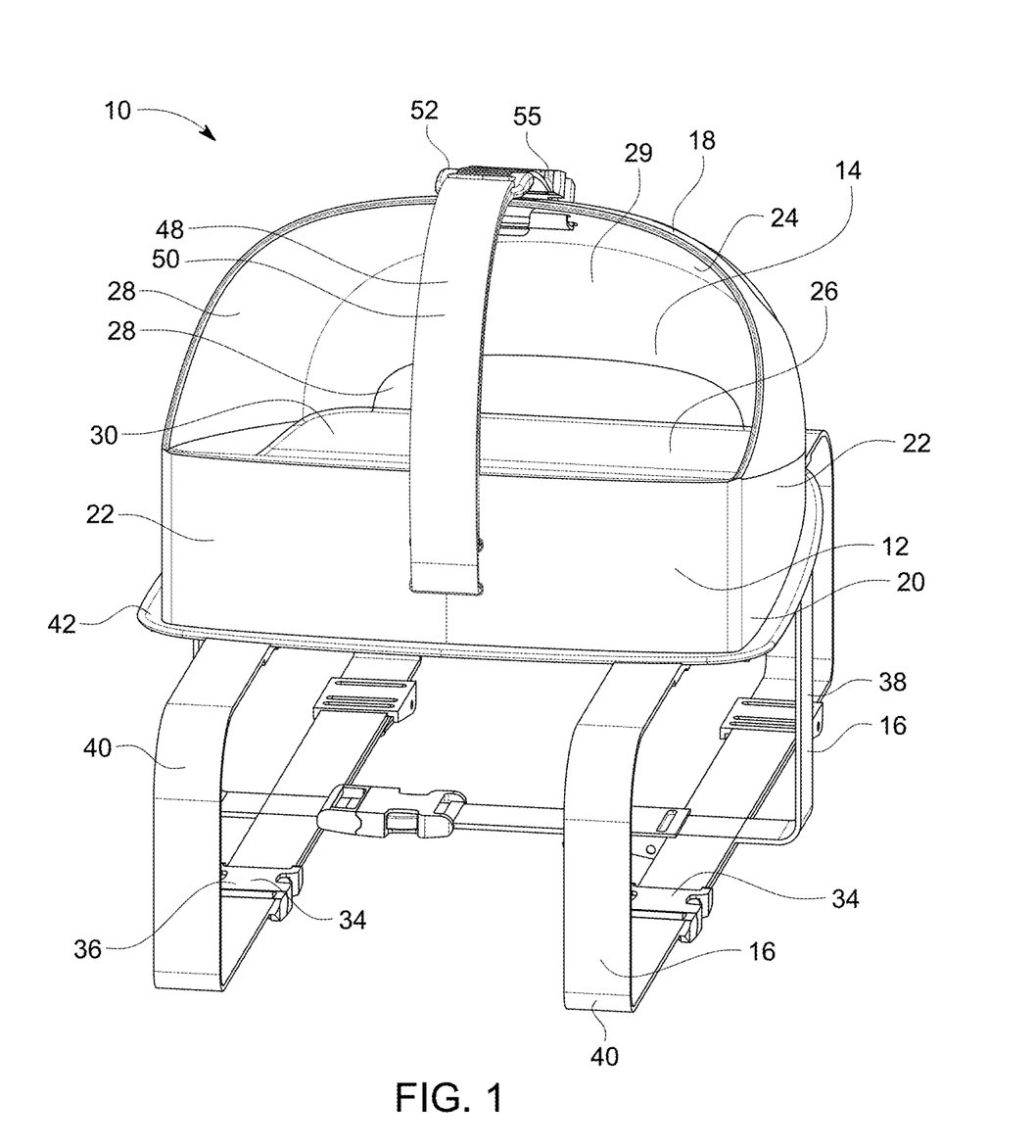
FIG. 1 is a perspective front view of an apparatus according to an embodiment of the present invention.
Figure 2:
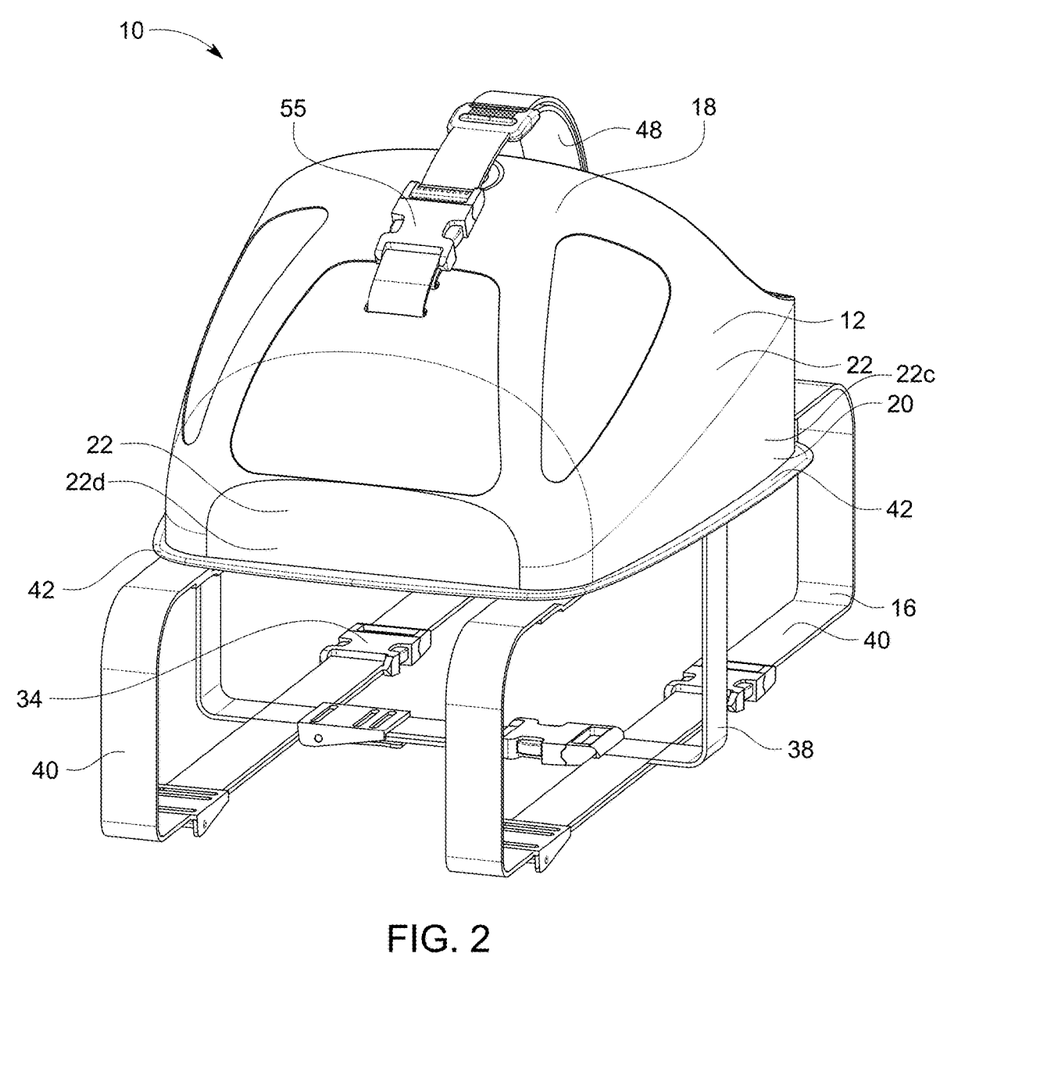
FIG. 2 is a perspective back view of the apparatus of FIG. 1.
Figure 3:
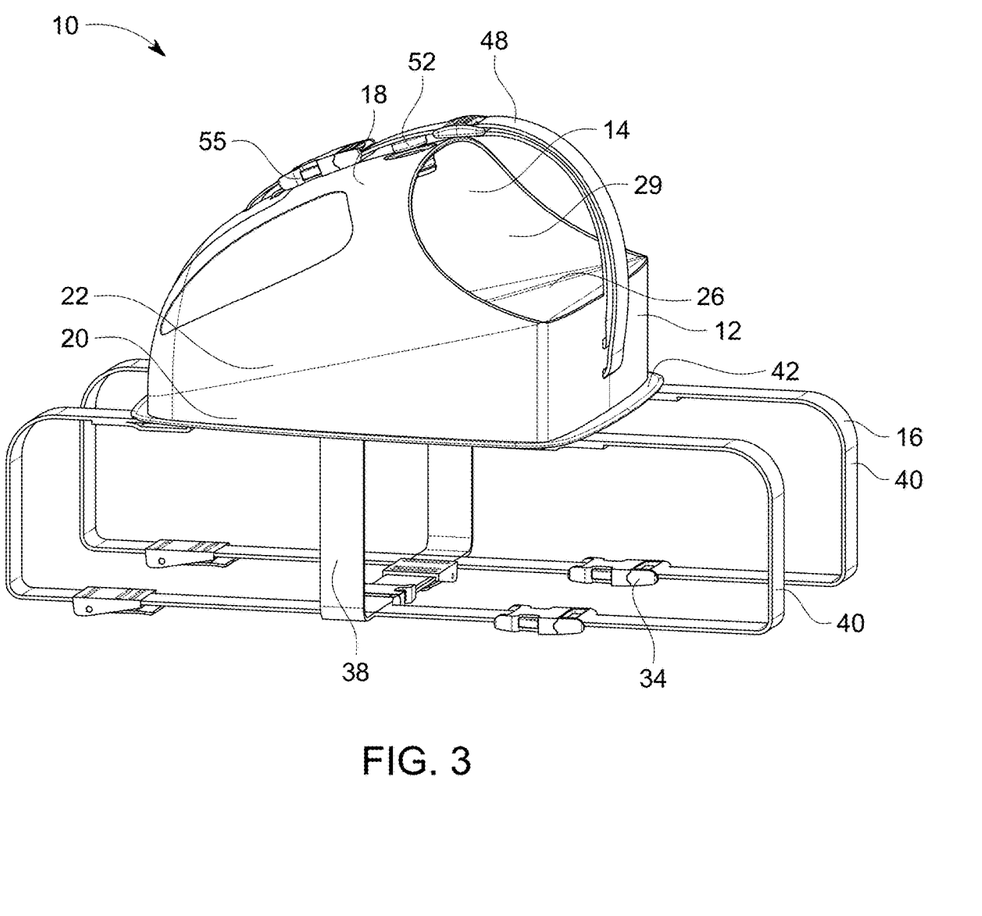
FIG. 3 is a perspective left side view of the apparatus of FIG. 1.
Figure 4:
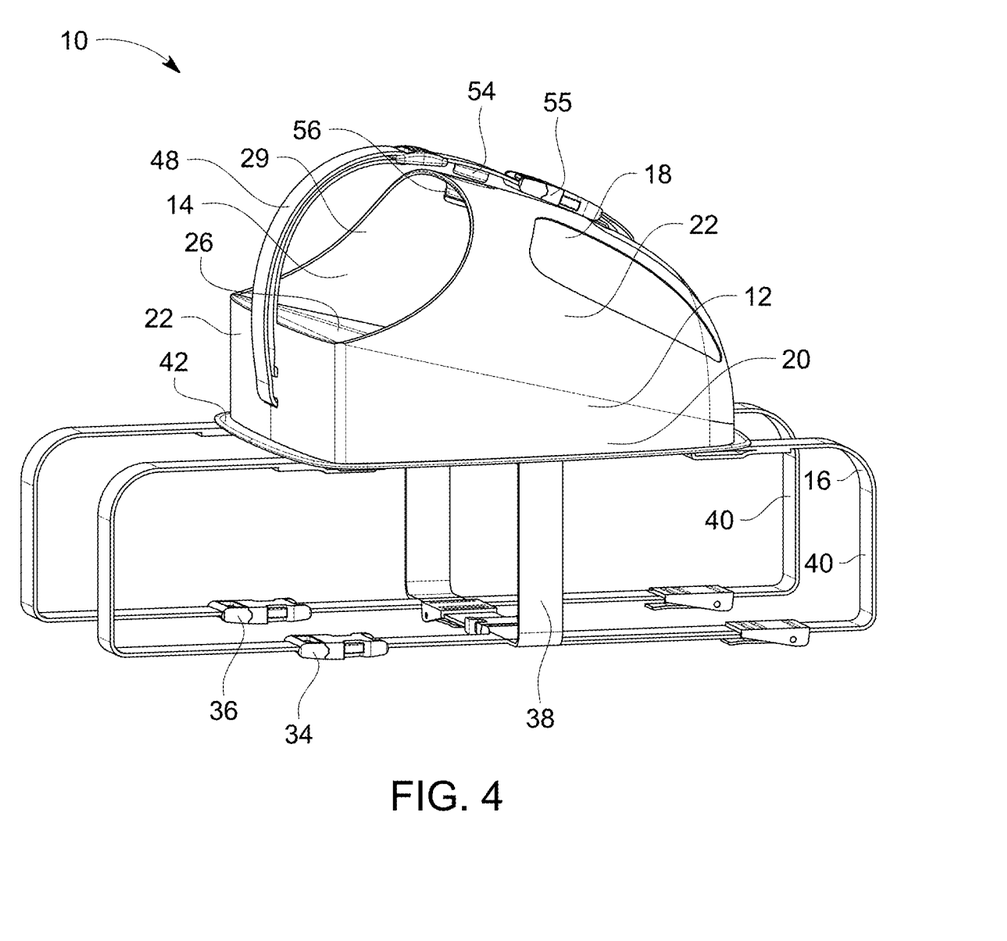
FIG. 4 is a perspective right side view of the apparatus of FIG. 1.
Figure 5:
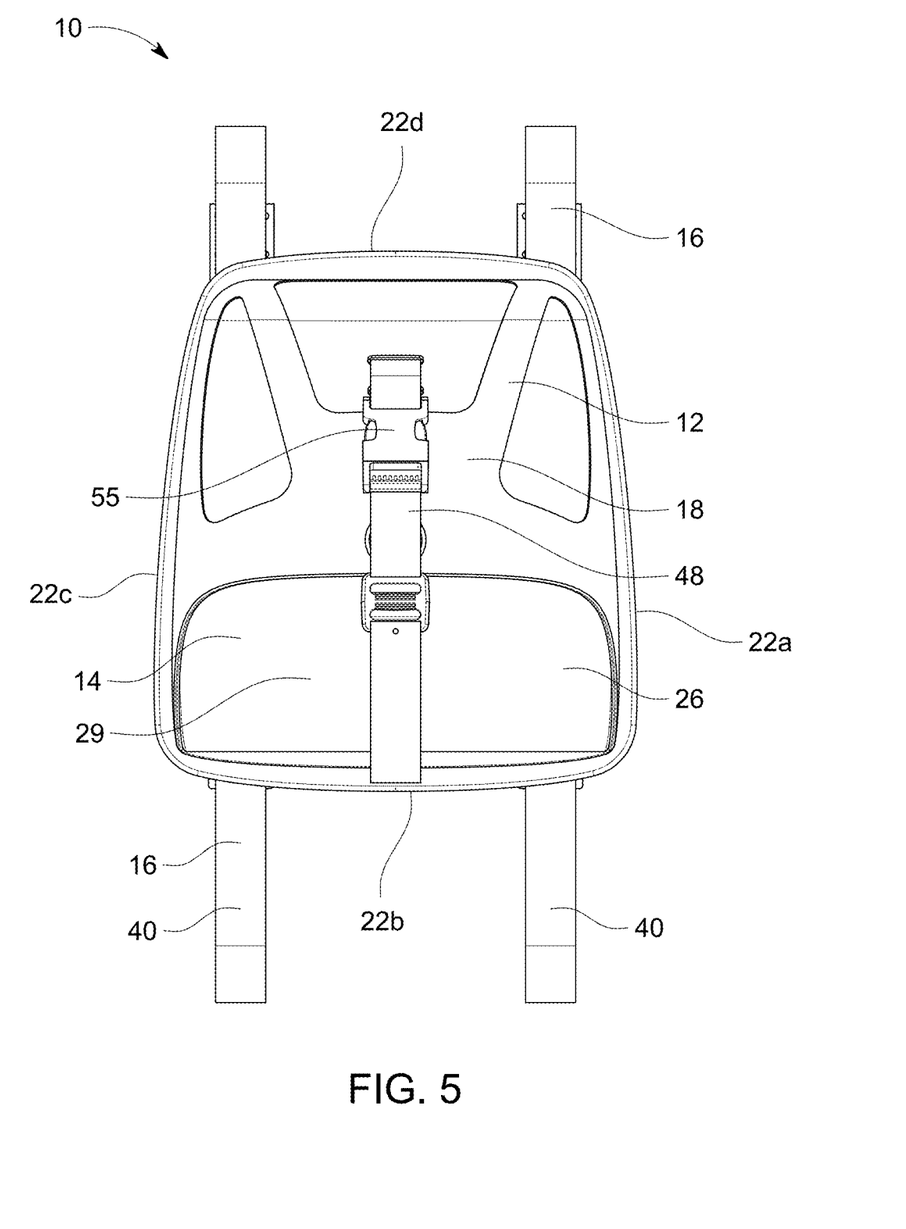
FIG. 5 is a top view of the apparatus of FIG. 1.
Figure 6:
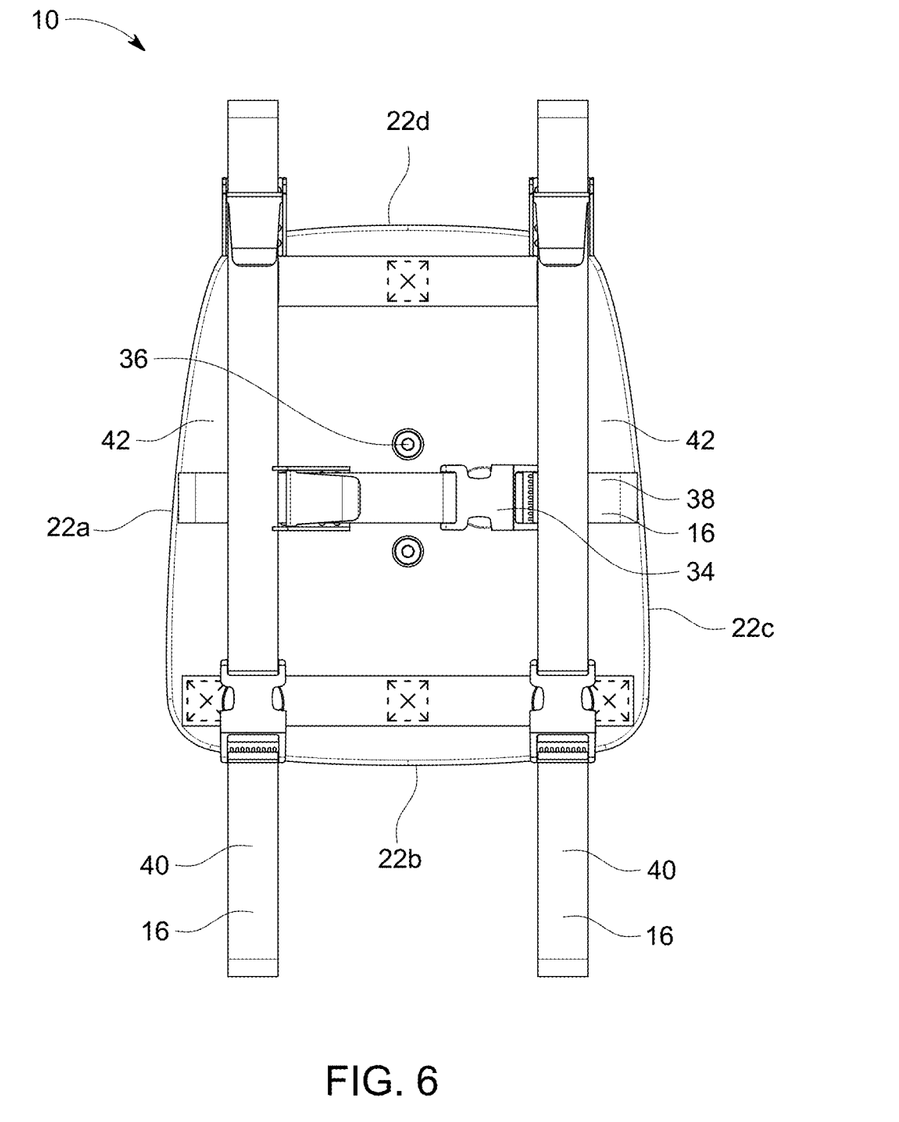
FIG. 6 is a bottom view of the apparatus of FIG. 1.
Figure 7:
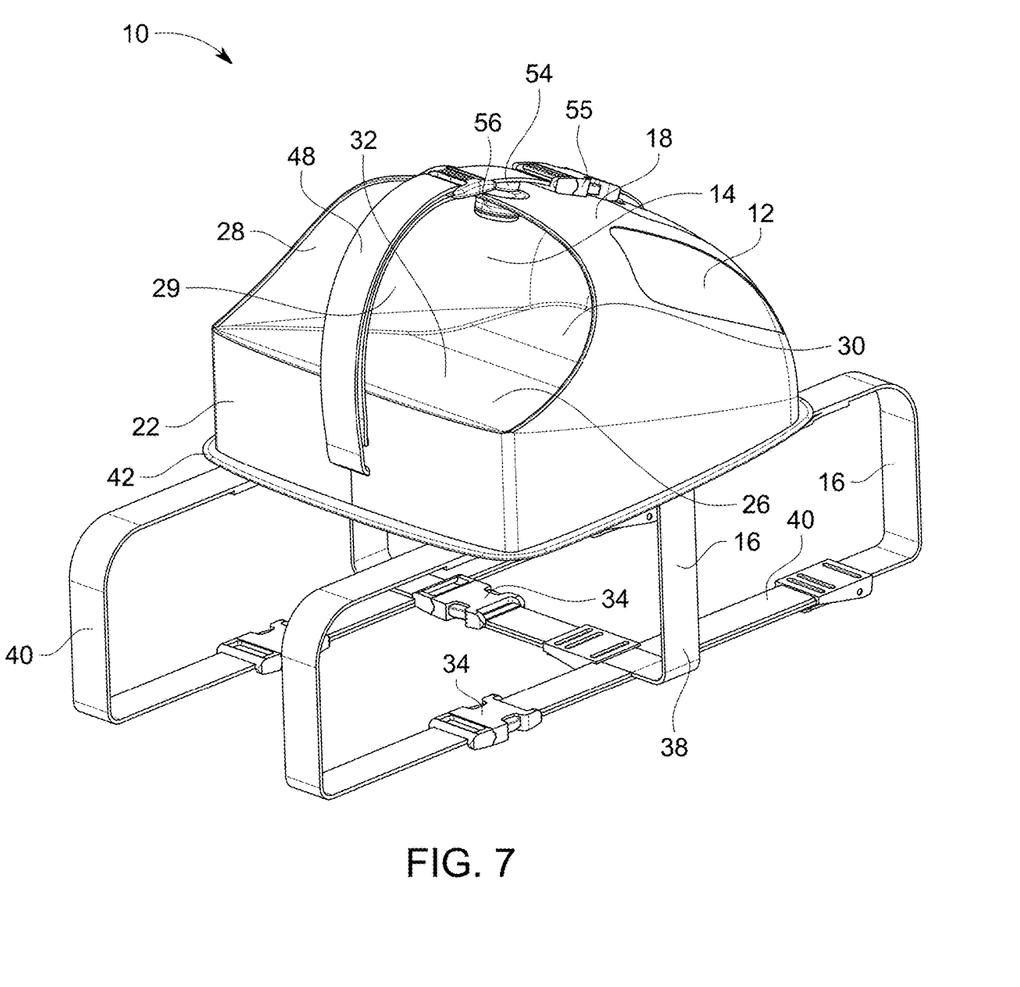
FIG. 7 is a perspective top view of the apparatus of FIG. 1.
Figure 8:
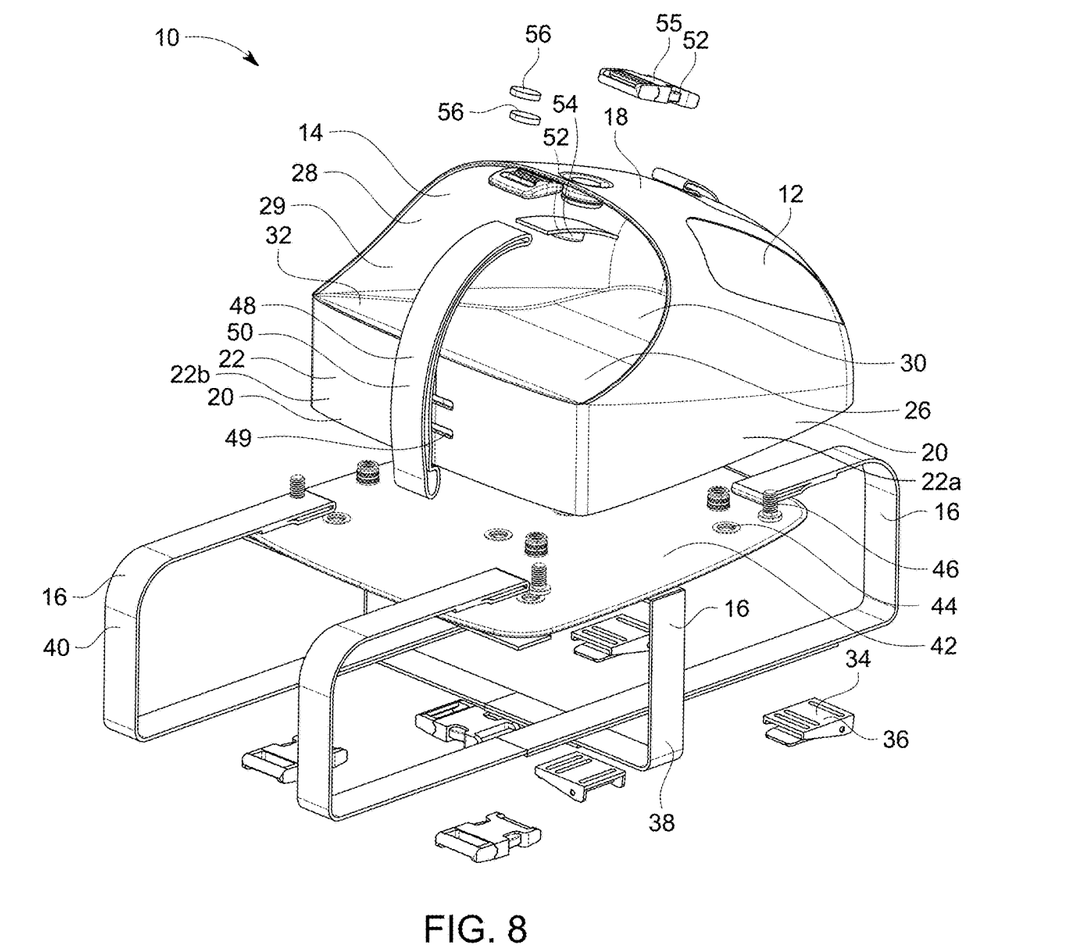
FIG. 8 is an exploded perspective top view of the apparatus of FIG. 1.

Referring to FIGS. 1 to 10, receptacle 14 is a cavity or depression formed in base 12 for receiving and holding a binocular. Receptacle 14 is formed in an oblong shape and includes a receptacle top 24, a receptacle bottom 26 opposite receptacle top 24, and three receptacle sides 28 disposed between receptacle top 24 and receptacle bottom 26. Receptacle top 24, receptacle bottom 26 and three receptacle sides 28 together form the walls of receptacle 14 and defines a receptacle opening 29 therebetween. Receptacle top 24, receptacle bottom 26, and three receptacle sides 28 may be rounded or flat in shape. As shown in FIGS. 7 and 8, receptacle bottom 26 may be flat, partially inclined or fully inclined in that receptacle bottom 26 may have a first section 30 that is flat, and a second section 32 that is inclined. Alternatively, first section 30 and second section 32 may both be flat and first section 30 and second section 32 may both be inclined. As shown in FIGS. 1, and 7 to 9, receptacle 14 includes a rounded receptacle top 24, a receptacle bottom 26 that is Partially inclined upwards towards receptacle opening 29, where first section 30 is flat and second section 32 is inclined towards receptacle opening 29, and rounded receptacle sides 28. This arrangement of having first section 30 being flat and second section 32 being inclined functions to retain an inserted binocular within receptacle 14. While receptacle 14 is formed in the general shape of an oblong slot with a partially inclined receptacle bottom 26, it will be understood by a person skilled in the art that receptacle 14 may be formed of any other suitable shape, size and dimension to fit binoculars of varying shapes, sizes and dimensions. For example, receptacle 14 may be formed generally in the shape of a binocular, or in the shape of a rectangle, square-oval, etc. Further, it will be understood by a person skilled in the art that receptacle 14 may be integral to base 12 or a separate element integrated with or connected to base 12.

Referring to FIGS. 1 to 10, one or more mounting straps 16 is connected to base 12 for mounting base 12 to the center console storage compartment of the vehicle. One or more mounting straps 16 is any strap, cord, band, etc., that may be used to attach base 12 to the center console of a vehicle. One or more mounting straps 16 may be connected to base 12 using any suitable means, including, but not limited to, stitching, heat welding, screwing, etc. One or more mounting straps 16 is of a sufficient length to wrap around the centre console of a vehicle. Accordingly, one or more mounting straps 16 may be of various lengths to accommodate for various sizes of centre consoles in vehicles. One or more mounting straps 16 may include one or more mounting strap fasteners 34 for fastening one or more mounting straps 16 together. Mounting strap fasteners 34 may be buckles 36, or any other suitable fastener for fastening two mounting straps 16 together. As illustrated in FIGS. 1 to 10, one or more mounting straps 16 includes: a first mounting strap 38 connected to base 12 in a first direction and extending from first base side 22a and third base side 22c; and a second mounting strap 40 connected to base 12 in a second direction perpendicular to the first direction and extending from second base side 22b and fourth base side 22d. One or more mounting straps 16 includes a second of second mounting strap 40, spaced apart and parallel to second mounting strap 40, connected to base 12 in the second direction. This orientation of the three mounting straps 16 provides a secure mounting of base 12 to the center console of the vehicle. However, it will be understood by a person skilled in the art, that one or more mounting straps 16 may be oriented in any suitable manner, one or more mounting straps 16 may be attached to base 12 in any suitable manner, and one or more mounting straps 16 may or may not include mounting strap fasteners 34 (as one or more mounting straps 16 may be tied to one another to secure base 12 to the center console of a vehicle).

Figure 9:
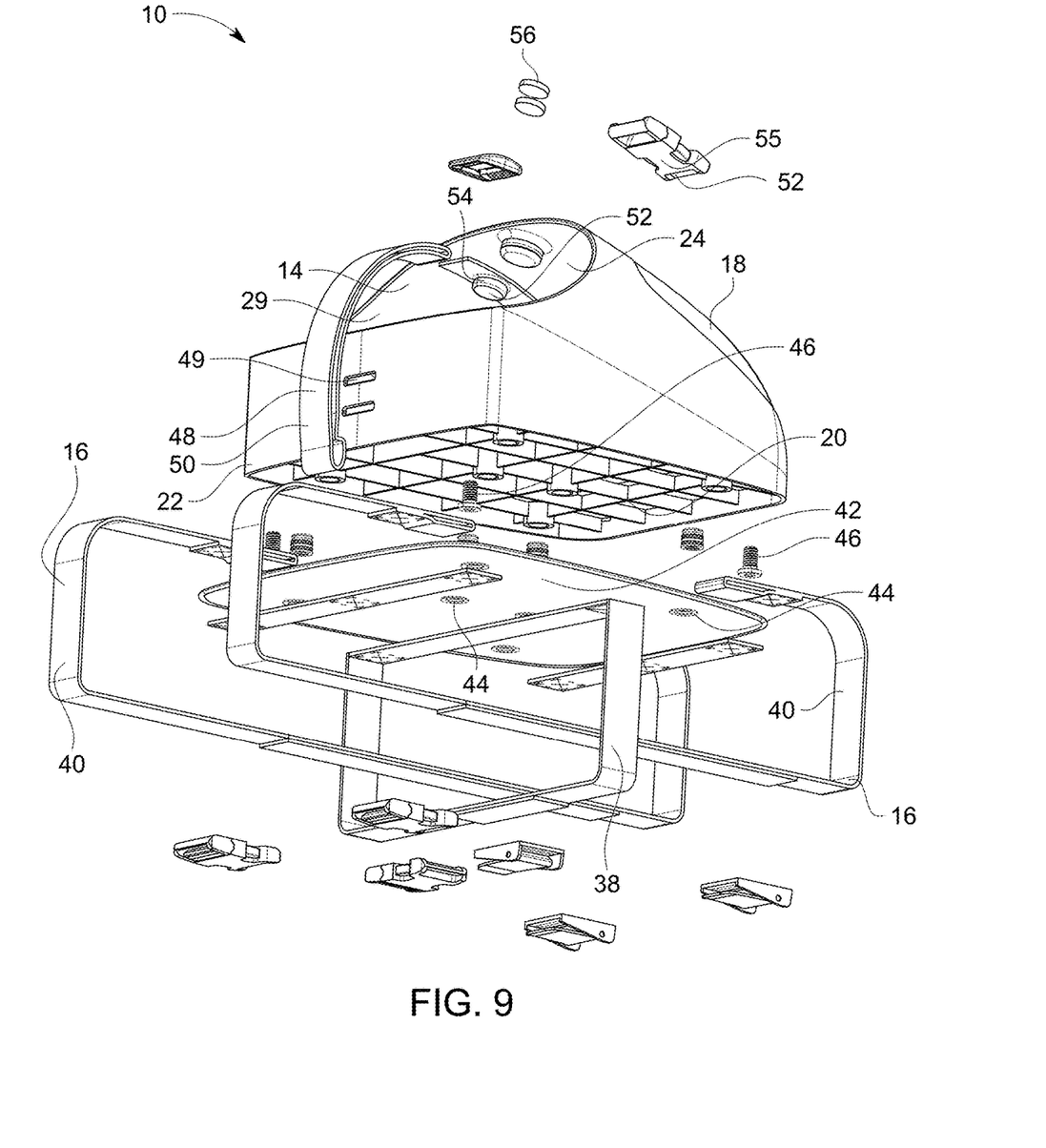
FIG. 9 is an exploded perspective bottom view of the apparatus of FIG. 1.
Figure 10:
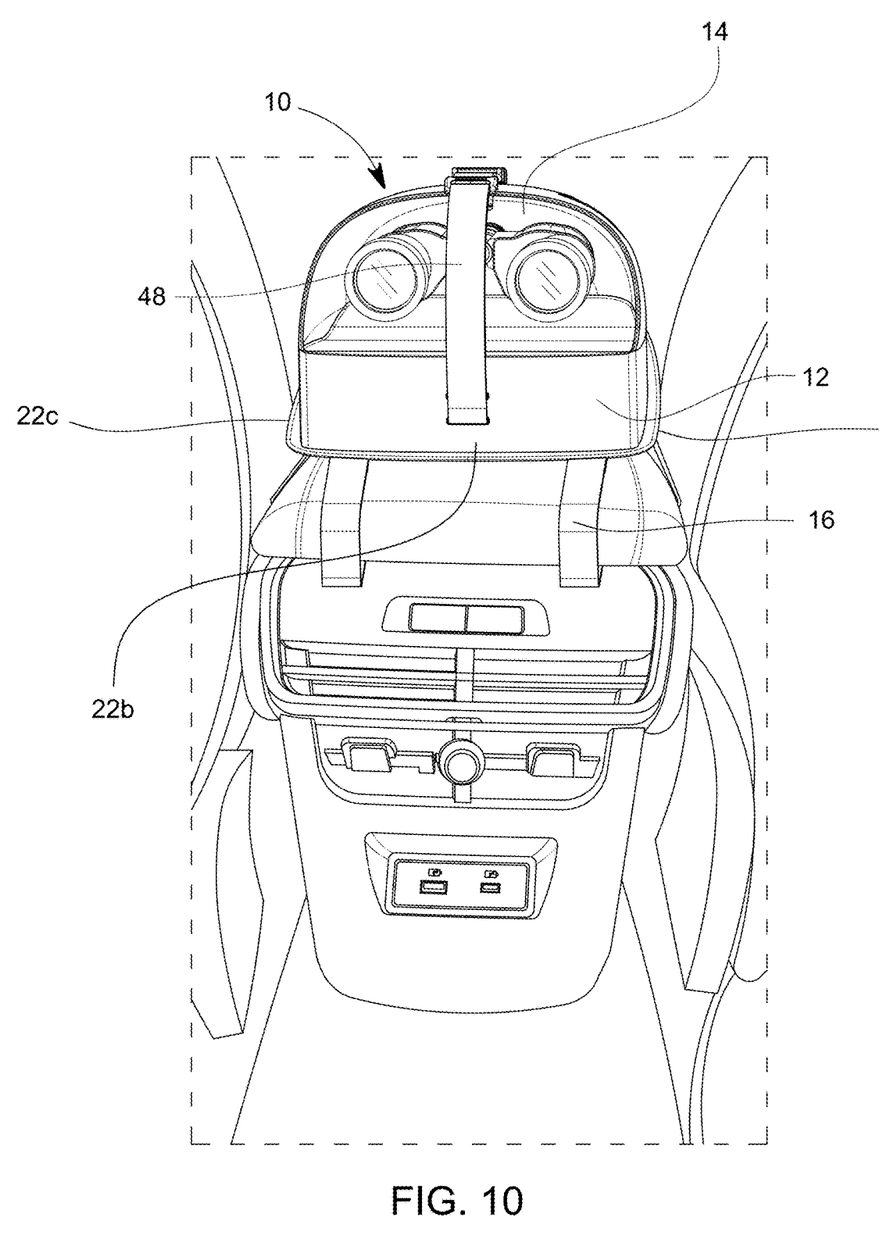
FIG. 10 is a perspective view of the apparatus of FIG. 1 shown in the environment in which the apparatus is deployed, being attached to the centre console of a vehicle and with a binocular inserted and retained in the apparatus.

As illustrated in FIGS. 1 to 10, base 12 further includes a mounting panel 42 connected to base bottom 20. Mounting panel 42 functions to connect base 12 to mounting straps 16. Mounting panel 42 may be formed of a flexible material or stiff material. Preferably, mounting panel 42 is formed of a flexible material. As shown in FIG. 9, mounting panel 42 is formed of a flexible textile material, such as a canvas cloth. Mounting panel 42 includes a plurality of mounting apertures 44 and corresponding mounting fasteners 46. Mounting apertures 44 and mounting fasteners 46 are for mounting mounting panel 42 to base bottom 20. One or more mounting straps 16 are connected to mounting panel 42.

Referring to FIGS. 1 to 10, apparatus 10 further includes one or more removable restraints 48 connected to base 12 for retaining the binocular in receptacle 14. One or more removable restraints 48 prevents an inserted binocular from being unintentionally displaced from or slipping out of receptacle 14. As illustrated in FIGS. 1 to 10, one removable restraint 48 is connected to base 12. As shown in FIGS. 8 and 9, removable restraint 48 is connected to base 12 via looping removable restraint 48 through slots 49 in base 12. However, it will be understood by a person skilled in the art that one or more removable restraints 48 may include two removable restraints 48, three removable restraints 48, etc., and may be connected to base 12 in any other suitable manner, such as through heat welding, use of a fastener, etc.

Referring to FIGS. 1 to 10, one or more removable restraints 48 may be one or more restraining straps 50. One or more restraining straps 50 extends from base bottom 20 or base side 22 to base top 18, over receptacle opening 29. One or more restraining straps 50 have a length and the length is adjustable. The length of one or more restraining straps 50 may be lengthened or shortened to accommodate for different sizes of binoculars. As illustrated in FIGS. 1 to 10, one restraining strap 50 is a strap formed of a flexible material. However, it will be understood by a person skilled in the art, that one restraining strap 50 may be any suitable strap or cord, such as a band, a bungee cord, etc.

Referring to FIGS. 1 to 10, one or more restraining straps 50 may include one or more restraining strap fasteners 52 for removably fastening one or more restraining straps 50 to base 12. As shown in FIGS. 8 and 9, one or more restraining strap fasteners 52 are a magnet 54 and a clip 55. Base 12 further includes a second magnet 56 disposed on base 12 to cooperate with magnet 54. Clip 55 functions as a secondary fastener for removably fastening one or more restraining straps 50 to base 12. However, it will be understood by a person skilled in the art that restraining strap fasteners 52 may be any suitable fastener for fastening one or more restraining straps 50 to base 12 and that there may be any number of restraining strap fasteners 52. For example, restraining strap fastener 52 may be a buckle, a hook and loop fastener, a magnet, etc.

As shown in FIGS. 1 to 10, one or more removable restraints 48 is a restraining strap 50. However, it will be understood by a person skilled in the art that one or more removeable restraints 48 may include any other form or device that can function to retain a binocular in receptacle 14, for example, a sliding cover, a flip cover, etc.

Referring to FIGS. 1 to 10, to install apparatus 10 to the center console storage compartment of a vehicle, the user will wrap one or more mounting straps 16 around the center console storage compartment of the vehicle and secure with mounting strap fasteners 34 (i.e., buckling buckles 36 together) or through any other means. As mounting panel 42 is formed of a flexible material, mounting panel 42 will conform to the shape of the center console storage compartment of the vehicle and provide a more secure and stable mounting of apparatus 10 to the center console storage compartment of the vehicle. Installing apparatus 10 to the center console storage compartment of a vehicle in the manner described provides the benefits of: (a) making the stored binocular accessible to all passengers in the vehicle, regardless of whether they are seated in the front or back of the vehicle; and (b) keeping all parts of the center console of the vehicle fully accessible and operational (e.g., cup holders and storage space remains fully operational and useable).

Referring to FIGS. 1 to 10, in use, a binocular may be inserted into and stored in receptacle 14 of base 12. The binocular would rest on receptacle bottom 26. Receptacle bottom 26 having a first section 30 that is flat and a second section 32 that is inclined assists in retaining binoculars in receptacle 14. Restraints 48 further secures the binocular in receptacle 14 and prevents the binocular from being unintentionally displaced from receptacle 14 when the vehicle comes to a sudden and abrupt stop or when apparatus 10 is unintentionally knocked. When the user wishes to insert or remove the binocular from receptacle 14, the user may easily attach or detach restraining strap 50 to base top 18 via bringing magnet 54 into or out of contact with second magnet 56. The user may also connect clip 55 together to form a more secure connection between restraining strap 50 and base top 18. Magnet 54 provides a quick release, easy-access function for easily and quickly accessing a stored binocular, whereas clip 55 provides a more secure fastening of restraining strap 50 to base top 18 and therefore a more secure retainment of the binocular in receptacle 14.

While embodiments of the invention have been described and illustrated, such embodiments should be considered illustrative of the invention only. The invention may include variants not described or illustrated herein in detail. Thus, the embodiments described and illustrated herein should not be considered to limit the invention as construed in accordance with the accompanying claims.

What is claimed is:

1. An apparatus for receiving and storing a binocular on a center console of a vehicle, the apparatus comprising:
   a base having a receptacle for receiving a binocular, the base having a first base side opposite a third base side, and a second base side opposite a fourth base side, wherein the receptacle has a receptacle top, a receptacle bottom opposite the receptacle top, and three receptacle sides disposed between the receptacle top and the receptacle bottom, the receptacle top, the receptacle bottom, and the three receptacle sides defining a receptacle opening therebetween;
   a first mounting strap connected to the base in a first direction and extending from the first base side and the third base side; and
   a second mounting strap connected to the base in a second direction perpendicular to the first direction and extending from the second base side and the fourth base side.

2. The apparatus of claim 1, wherein the receptacle bottom is partially inclined upwards towards the receptacle opening.

3. The apparatus of claim 1, wherein the first mounting strap and the second mounting strap further comprises one or more mounting strap fasteners for fastening the first mounting strap and the second mounting strap to each other.

4. The apparatus of claim 1, wherein the base further comprises a base bottom and a mounting panel connected to the base bottom.

5. The apparatus of claim 4, wherein the first mounting strap and the second mounting strap are connected to the mounting panel.

6. The apparatus of claim 5, wherein the mounting panel is formed of a flexible material.

7. The apparatus of claim 1 further comprising one or more removable restraints connected to the base for retaining the binocular in the receptacle.

8. The apparatus of claim 7, wherein the one or more restraints is one or more restraining straps.

9. The apparatus of claim 8, wherein the one or more restraining straps have a length and the length is adjustable.

10. The apparatus of claim 8, wherein the one or more restraining straps further comprises one or more restraining strap fasteners for removably fastening the one or more restraining straps to the base.

11. The apparatus of claim 10, wherein the one or more restraining strap fasteners is a magnet and the base further comprises a second magnet disposed to cooperate with the magnet.

12. The apparatus of claim 11, wherein the one or more restraining strap fasteners further comprises a clip.

* * * * *